US006937640B2

(12) United States Patent
Yun et al.

(10) Patent No.: US 6,937,640 B2
(45) Date of Patent: Aug. 30, 2005

(54) APPARATUS AND METHOD FOR REPORTING SERVICE LOAD TO MOBILE STATION IN MOBILE TELECOMMUNICATION SYSTEM

(75) Inventors: Yu-Suk Yun, Seoul (KR); Soon-Young Yoon, Seoul (KR); Hee-Won Kang, Songnam-shi (KR); Jae-Heung Yeom, Seoul (KR); Sang-Hyun Yang, Seoul (KR); Hoon Huh, Daejeon-Kwangyok-shi (KR)

(73) Assignee: Samsung Electronics Co., LTD (KR)

( * ) Notice: Subject to any disclaimer, the term of this patent is extended or adjusted under 35 U.S.C. 154(b) by 827 days.

(21) Appl. No.: 09/882,322

(22) Filed: Jun. 15, 2001

(65) Prior Publication Data

US 2002/0012385 A1 Jan. 31, 2002

(30) Foreign Application Priority Data

Jun. 21, 2000 (KR) ........................................ 2000-34211

(51) Int. Cl.[7] ................................................ H04L 27/30

(52) U.S. Cl. ....................... 375/141; 375/146; 375/295; 455/13.4; 455/33.2; 370/331; 370/335; 370/437; 370/491; 370/500

(58) Field of Search ................................. 375/140, 141, 375/146, 219, 220, 295; 455/13.4, 33.2; 370/252, 320, 331, 335, 342, 437, 441, 479, 490, 500

(56) References Cited

U.S. PATENT DOCUMENTS

| | | | | |
|---|---|---|---|---|
| 5,267,261 A | | 11/1993 | Blakeney, II et al. | |
| 6,493,333 B1 | * | 12/2002 | Kim et al. | 370/342 |
| 6,577,608 B1 | * | 6/2003 | Moon et al. | 370/311 |
| 6,810,264 B1 | * | 10/2004 | Park et al. | 455/522 |

OTHER PUBLICATIONS

Canadian Office Action dated Jan. 21, 2004, issued in a counterpart application, namely, Appln. No. 2,382,377.

* cited by examiner

*Primary Examiner*—Dac V. Ha
(74) *Attorney, Agent, or Firm*—Dilworth and Barrese, LLP

(57) ABSTRACT

There is provided a method and apparatus for selecting an appropriate base station and an optimal data rate to provide a voice service and a data service based on a voice service load in a CDMA system. A base station transmits two pilot signals orthogonally spread with different orthogonal codes in association with its voice service load, and a mobile station estimates the voice service load based on a pilot power ratio.

9 Claims, 9 Drawing Sheets

APPARATUS AND METHOD FOR REPORTING SERVICE LOAD TO MOBILE STATION IN MOBILE TELECOMMUNICATION SYSTEM

PRIORITY

This application claims priority to an application entitled "Apparatus and Method for Reporting Service Load to Mobile Station in Mobile Telecommunication System" filed in the Korean Industrial Property Office on Jun. 21, 2000 and assigned Ser. No. 2000-34211, the contents of which are hereby incorporated by reference.

BACKGROUND OF THE INVENTION

1. Field of the Invention

The present invention relates generally to a CDMA (Code Division Multiple Access) mobile telecommunication system, and in particular, to an apparatus and method for reporting a voice service load to a mobile station in a system supporting both a voice service and a data service.

2. Description of the Related Art

In CDMA, a pilot signal used for initial acquisition and channel estimation is transmitted continuously or periodically in time. In an IS-2000 based system a base station transmits the pilot signal continuously, while in an HDR (High data Rate) based system, the base station, transmits the pilot signal periodically.

In an IMT-2000 system, a mobile station, if it wants to receive a data service, measures the reception strength (Ec/Io) of a forward pilot signal transmitted continuously from the base station and reports the reception strength to the base station regardless of a handoff situation or a normal situation. The base station then transmits information about a data rate corresponding to the reception strength to the mobile station and provides the data service to the mobile station at the data rate on a supplemental channel (SCH).

Meanwhile, in the HDR system proposed for a high data rate service, the mobile station, if it wants to receive a data service, measures the reception strength (C/I) of a forward burst pilot signal, selects a data rate and a sector corresponding to the reception strength regardless of a handoff situation or a normal situation, and transmits the data rate and the sector as a signal to the base station on a reverse DRC (Data Rate Control) channel in each slot. Upon receipt of forward data rate requests from mobile stations within the sector, the base station schedules user data according to the amount of user packet data and the requested data rates, determines a mobile station to be serviced in next slots after the current packet is completely transmitted, and provides the data service to the selected mobile station at the requested data rate. Here, the base station transmits a traffic channel to a mobile station in time division by scheduling.

The base station can transmit a pilot signal in the above two methods and the mobile station implements a handoff according to the pilot signal. For handoff, the mobile station manages neighboring base stations. The base stations are grouped into sets. The base station sets are categorized as an active set, a candidate set, a neighbor set, and a remaining set. If two or more base stations belong to the active set, the mobile station is placed in a handoff situation. If only one base station exists in the active set, the mobile station is in a normal situation. Base station sets and set management associated with the present invention will be described below.

For voice service, the mobile station usually performs a soft handoff in which it communicates with all the base stations in the active set. For data service, the mobile station performs the soft handoff or a hard handoff in which it selects one of the base stations in the active set and communicates with the selected base station in a handoff area. To determine which base stations belong to the active set, the mobile station measures the reception power of pilot signals received from the base stations and reports the measurements to the network. If the reception power measurement is at a threshold level or above, the network requests that the mobile station includes in the active set the base station whose reception power is at or above the threshold level. The mobile station then classifies that base station in the active set as requested.

In the case of a hard handoff for data service, the mobile station selects a base station corresponding to the strongest of the reception power of pilot signals from the base stations in the active set and reports the selected base station to the network. Communication with the base station corresponding to the strongest pilot reception power is favorable for voice service because as the base station offers stronger pilot reception power, it can provide a better quality voice service. In data service, however, the quality of a data service and a data rate available to the mobile station are determined according to the transmission power of the base station. Therefore, the pilot reception power cannot be the only criterion by which the mobile station selects a base station for handoff in order to receive a good quality data service.

FIG. 1 is a flowchart illustrating a signal reception procedure in a mobile station to select a base station in a handoff situation or a normal situation in a conventional system employing a continuous pilot transmission scheme.

Referring to FIG. 1, the mobile station measures the reception strengths (Ec/Io) of pilot signals from all base stations in an active set that the mobile station manages for handoff in step 101. In step 103, the mobile station reports information about the strongest reception power and a base station corresponding to the strongest reception power to the network. The network determines a data rate available to the mobile station based on the reported information and transmits the determined data rate as a signal to the mobile station. The mobile station receives the determined data rate from the network in step 105.

FIG. 2 is a flowchart illustrating a signal reception procedure in a mobile station to select a base station in a handoff situation or a normal situation in another conventional system employing a periodic pilot transmission scheme.

Referring to FIG. 2, the mobile station measures the reception strengths (C/I) of pilot signals from all base stations in an active set that the mobile station manages for handoff in step 201. If two or more base stations belong to the active set, the mobile station is placed in a handoff situation. If only one base station exists in the active set, the mobile station is in a normal situation. In step 203, the mobile station determines a base station and a data rate corresponding to the strongest reception power. The mobile station transmits information about the determined base station and data rate to the network in a DRC symbol that is transmitted in every slot in step 205.

As described above, the mobile station selects a base station to provide a data service and a data rate for the data service based on pilot reception power without considering transmission power that the base station can spare for the data service in the conventional systems. The pilot signal is a signal transmitted with fixed power from a base station.

When a data service and a voice service are provided at the same time, the base station first determines transmission power for the voice service (or voice load) and then assigns the remaining power to the data service. In other words, even though the reception power of a pilot signal is great, it does not imply that the reception power of the data service is great. Hence, it is preferable that the mobile station selects a base station with the highest data service power for data service. Therefore, the best base station and an optimal data rate cannot be determined based on pilot reception power alone.

SUMMARY OF THE INVENTION

An object of the present invention is, therefore, to provide an apparatus and method for enabling a mobile station receiving a data service or both a data service and a voice service to select a base station that can provide best services and an optimal data rate in a mobile telecommunication system.

Another object of the present invention is to provide an apparatus and method for selecting an optimal base station and determining an optimal data rate based on transmission power of base stations available for a data service being received by a mobile station in a mobile telecommunication system.

A further object of the present invention is to provide an apparatus and method for broadcasting a voice service load of the base station so that a mobile station receiving a data service or both the data service and a voice service can estimate the transmission power of the base station available for the data service in a mobile telecommunication system.

Still another object of the present invention is to provide an apparatus and method for transmitting two pilot signals with two different orthogonal codes in a base station of a mobile telecommunication system.

Yet another object of the present invention is to provide an apparatus and method for estimating the transmission power of a base station available for a data service based on the reception strengths of two pilot signals received from the base station by a mobile station of a mobile telecommunication system.

The foregoing and other objects can be achieved by providing an apparatus and method for selecting an appropriate base station and an optimal data rate to provide a voice service and a data service based on a voice service load to provide a voice service and a data service in a mobile telecommunication system.

In a base station, a pilot gain controller generates a first gain value and a second gain value according to a current transmission power and a remaining transmission power of the base station, a first multiplier receives pilot bits and generates a first control signal by controlling the transmission power level of the pilot bits with the first gain value, a second multiplier receives the pilot bits and generates a second control signal by controlling the transmission power level of the pilot bits with the second gain value, a first spreader generates a first pilot signal by spreading the first control signal with a first orthogonal code, a second spreader generates a second pilot signal by spreading the second control signal with a second orthogonal code different from the first orthogonal code, and an adder adds the first pilot signal to the second pilot signal.

In a mobile station, a first receiver despreads the first pilot signal received on a forward pilot channel with the first orthogonal code and measures reception power of the first despread signal, a second receiver despreads the second pilot signal received on the forward pilot channel with the second orthogonal code and measures a reception power of the second despread signal, and a service load estimator estimates the current transmission power and the remaining transmission power of the base station by utilizing a ratio of a second pilot signal reception power to a first pilot signal reception power.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The present invention provides a method of broadcasting a voice service load to mobile stations in a base station. According to the present invention, a power ratio of a first pilot signal to a second pilot signal is transmitted in association with a voice load, the two pilot signals being orthogonally spread with different orthogonal codes. For example, a base station with a 30% voice load transmits two pilot signals such that a comparative pilot-reference pilot power ratio is 0.3. This is applicable to both the systems where pilot signals are transmitted continuously and periodically in time. Then, a mobile station estimates the voice service load of the base station based on the power ratio and determines the transmission power of the base station available for a data service. Here, it is assumed that the IS-2000 system transmits a pilot signal continuously in time and the HDR system transmits a pilot signal periodically in time.

Figure 1:
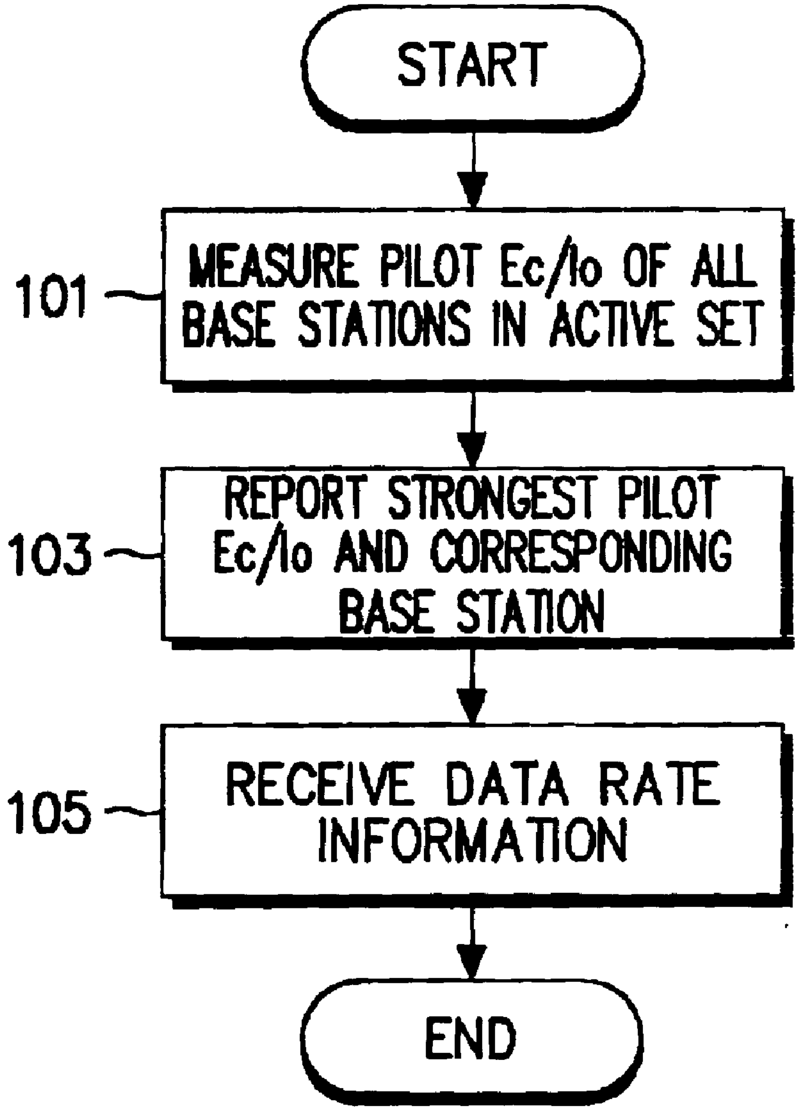
FIG. 1 is a flowchart illustrating a signal reception procedure to select a base station in a mobile station in a handoff situation or a normal situation in a conventional system where a pilot signal is transmitted continuously in time.
Figure 2:
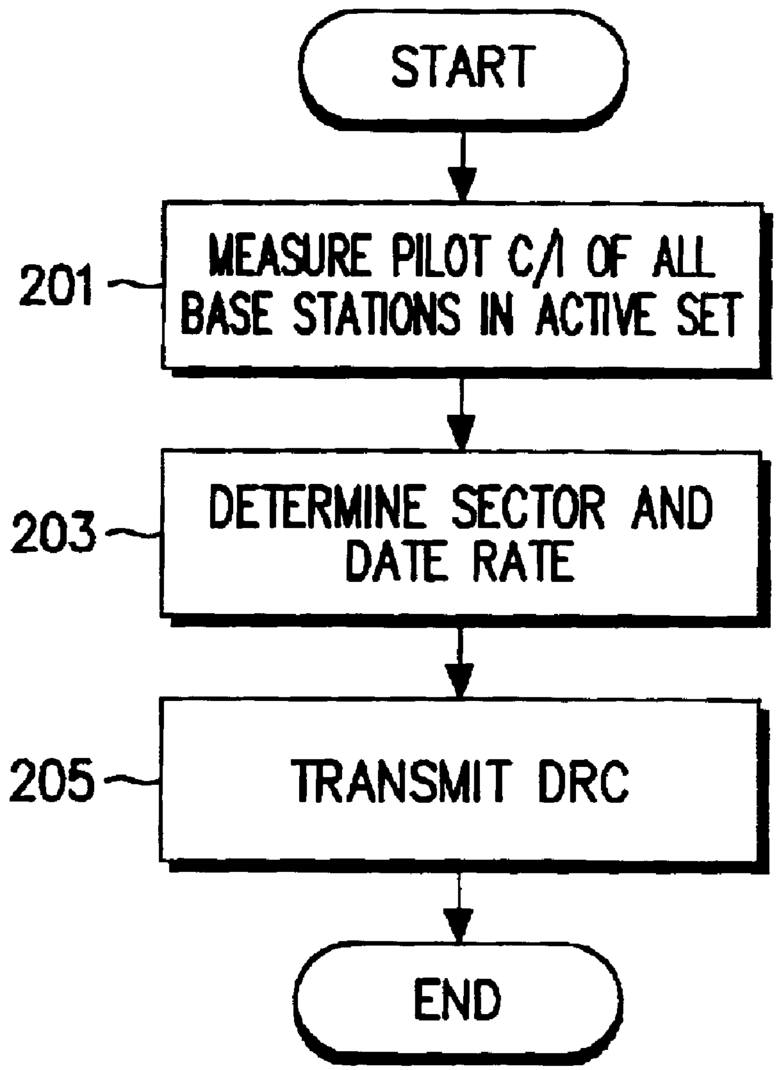
FIG. 2 is a flowchart illustrating a signal reception procedure to select a base station in a mobile station in a handoff situation or a normal situation in another conventional system where a pilot signal is transmitted periodically in time.
Figure 3:
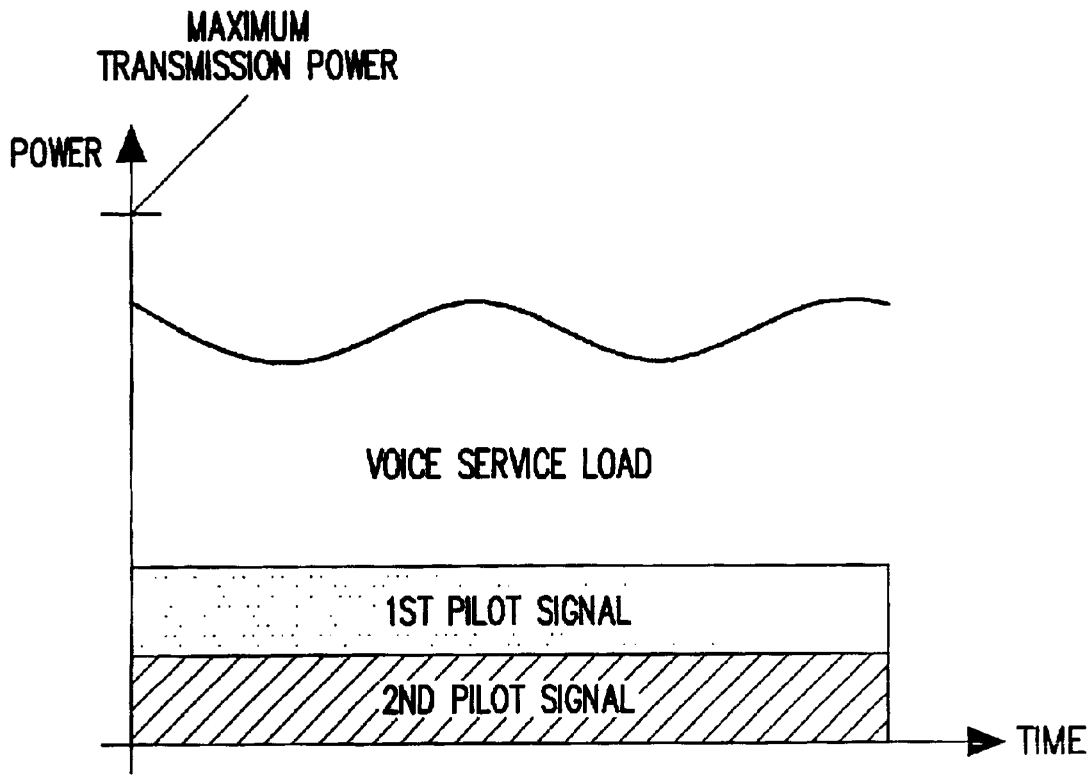
FIG. 3 is a graph showing pilot signals transmitted continuously in time and a voice service load in a mobile telecommunication system according to an embodiment of the present invention.

FIG. 3 illustrates pilot signals transmitted continuously in time and a voice service load in a mobile telecommunication system according to an embodiment of the present invention. As noted from FIG. 3, the transmission power of the pilot signals does not vary with time, while the voice service load varies with time. By definition, the maximum transmission power of the base station minus the transmission power of the first and second pilot signals and the power assigned to the voice service load is the remaining available transmission power of the base station, or in particular, is the transmission power available to a data service. The transmission power of the pilot signals is chosen such that a power ratio of the second pilot signal to the first pilot signal is representative of the power of the voice service load. Thus, the mobile station estimates the transmission power of the base station available for the data service by calculating a ratio of the reception powers of the second pilot signal to the first pilot signal broadcast from the base station.

Figure 4:
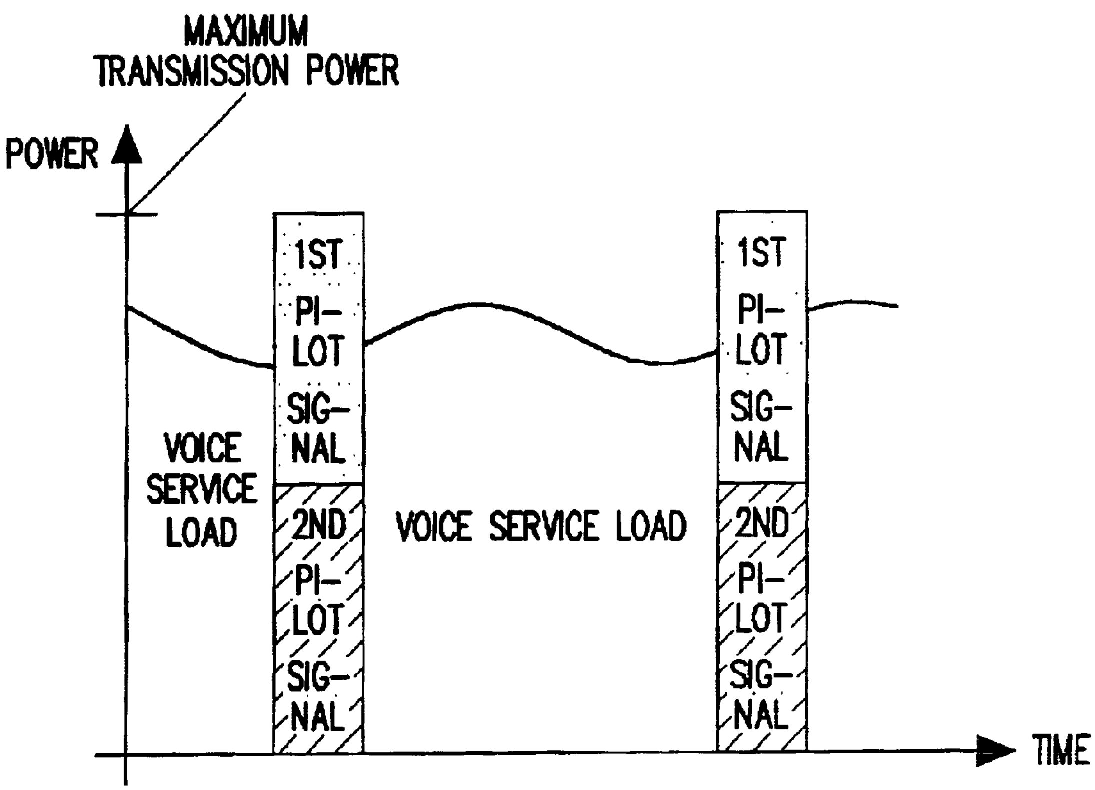
FIG. 4 is a graph showing pilot signals transmitted periodically in time and a voice service load in a mobile telecommunication system according to another embodiment of the present invention.

FIG. 4 illustrates pilot signals transmitted periodically in time and a voice service load in a mobile telecommunication system according to another embodiment of the present invention. As noted from FIG. 4, the total transmission power of the pilot signals does not vary with time, while the voice service load varies with time. The maximum transmission power of the base station minus the power assigned for the voice service load is the remaining available transmission power of the base station, or in particular, is the transmission power available to a data service. The transmission power of the pilot signals is chosen such that the ratio of the transmission powers of the second pilot signal to the first pilot signal is representative of the voice service load. Thus, the mobile station can estimate transmission power of the base station available for the data service by calculating a second pilot-first pilot power ratio.

In FIGS. 3 and 4, each first pilot signal is a reference pilot signal and each second pilot signal is a comparative pilot signal. The first and second pilot signals are orthogonally spread with different orthogonal codes. A base station transmitting device for transmitting two pilot signals with different orthogonal codes will be described with reference to FIG. 5.

Figure 5:
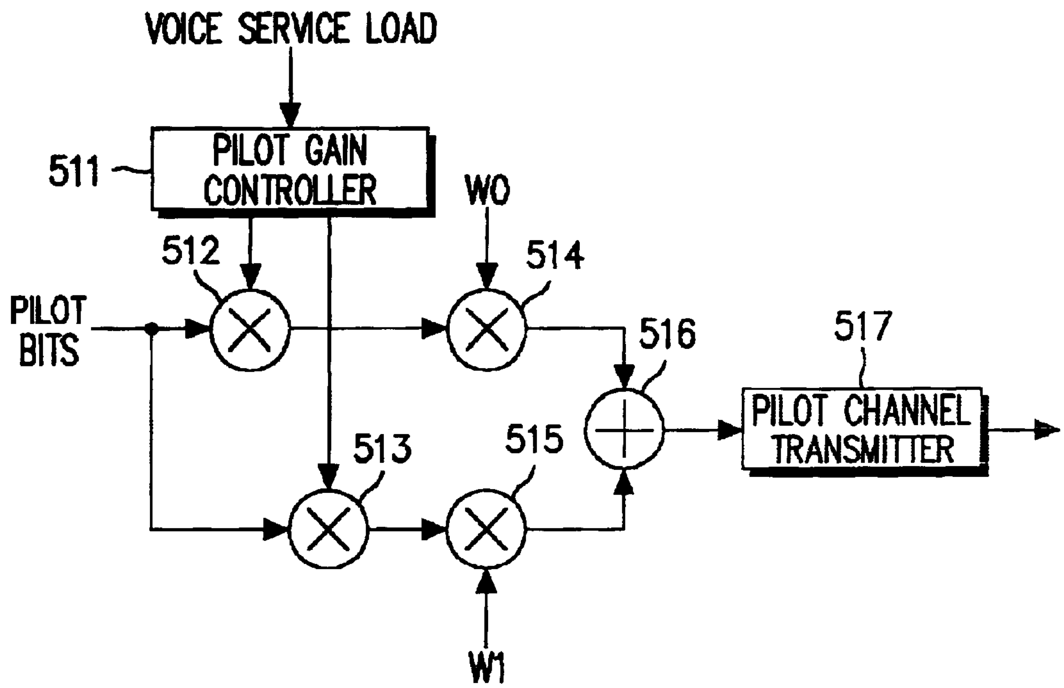
FIG. 5 is a block diagram of a base station-transmitting device for broadcasting a voice service load on a forward pilot channel according to the present invention.

FIG. 5 is a block diagram of a base station-transmitting device for broadcasting information descriptive of a voice service load on a forward pilot channel according to the present invention.

Referring to FIG. 5, a reference pilot multiplier 512 multiplies pilot bits by a first gain received from a pilot gain controller 511, for gain control. A comparative pilot multiplier 513 multiplies the pilot bits by a second gain received from the pilot gain controller 511, for gain control. The pilot bits are meaningless data of all 0s or 1s. The pilot gain controller 511 determines the first and second gains such that a comparative pilot-reference pilot power ratio is representative of a voice service load. An orthogonal spreader 514 multiplies the output of the reference pilot multiplier 512 by a first orthogonal code W0 assigned to the reference pilot signal. An orthogonal spreader 515 multiplies the output of the comparative pilot multiplier 515 by a second orthogonal code W1 assigned to the comparative pilot signal. An adder 516 adds the outputs of the orthogonal spreaders 514 and 515. A pilot channel transmitter 517 subjects the output of the adder 516 to PN spreading and frequency conversion and transmits the frequency-converted signal through an antenna (not shown). The pilot channel transmitter 517 may transmit the pilot signal continuously or periodically in time according to the pilot signal transmission scheme of the base station.

The signal transmitted in the path from the reference pilot multiplier 512 through the orthogonal spreader 514 and the adder 516 to the channel transmitter 517 is referred to as a first pilot signal, and the signal transmitted in the path from the comparative pilot multiplier 513 through the orthogonal spreader 515 and the adder 516 to the channel transmitter 517 is referred to as a second pilot signal.

In operation, the pilot gain controller 511 determines the reference pilot signal gain and the comparative pilot signal gain based on information of a voice, service load received from an upper layer controller (not shown). For example, if the voice service load of the serving base station is 30%, the gains of the reference and comparative pilot signals are determined by $$\text{gain of reference pilot signal} = \sqrt{\frac{1}{(1+0.3)}}$$

$$\text{gain of comparative pilot signal} = \sqrt{\frac{0.3}{(1+0.3)}} \qquad (1)$$

or more generally as $$\text{gain of reference pilot signal} = \sqrt{\frac{1}{(1+x)}}$$

$$\text{gain of comparative pilot signal} = \sqrt{\frac{x}{(1+x)}} \qquad (2)$$

where "x" is the percentage (in decimal form) of the maximum transmission power used by the voice service load.

The pilot bits are multiplied by the gains provided from the pilot gain controller 511 in the multipliers 512 and 513. The output signal of the reference pilot multiplier 512 becomes the first pilot signal after orthogonal spreading in the orthogonal spreader 514, and the output signal of the comparative pilot multiplier 513 becomes the second pilot signal after orthogonal spreading in the orthogonal spreader 515. The adder 516 adds the first and second pilot signals and the pilot channel transmitter 517 transmits the resulting pilot signal continuously or periodically in time according to the pilot signal transmission scheme of the base station.

Figure 6:
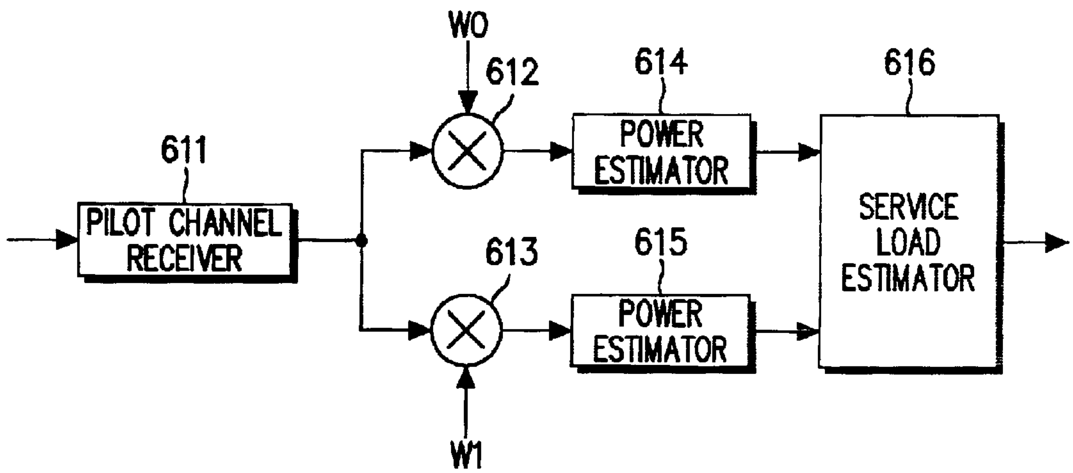
FIG. 6 is a block diagram of a mobile station receiver for receiving pilot channels spread with different orthogonal codes according to the present invention.

FIG. 6 is a block diagram of a mobile station receiving device for receiving two pilot signals representative of a voice service load according to the present invention.

Referring to FIG. 6, a pilot channel receiver 611 PN-despreacls a signal received on a pilot channel. The pilot channel signal may be a continuous or periodic signal in time depending on the pilot signal transmission scheme of the base station. An orthogonal despreader 612 orthogonally despreads the PN-despread signal with the first orthogonal code assigned to the first pilot signal, and an orthogonal despreader 613 orthogonally despreads the PN-despread signal with the second orthogonal code assigned to the second pilot signal. A power estimator 614 estimates the output signal of the orthogonal despreader 612, that is, the reception power of the first pilot signal, and a power estimator 615 estimates the output signal of the orthogonal despreader 613, that is, the reception power of the second pilot signal. A service load estimator 616 estimates a voice service load by calculating the ratio of the reception powers of the second pilot signal to the first pilot signal, i.e., a second pilot-first pilot power ratio, from the power estimated values received from the power estimators 614 and 615 and then estimates a data service load by subtracting the estimated voice service load from the overall load. Herein, the overall load means a total serviceable load. In other word, the overall load means maximum transmission power of the base station. Hereinbelow, a detailed explanation regarding how the mobile station knows the overall load of a BS is given as examples. The estimated data service load is used for the mobile station to select a base station suitable for providing the data service and determine an optimal data rate.

In operation, the pilot channel receiver 611 PN-despreads the signal received on the pilot channel. The pilot signal can be continuous or periodic in time. The output signal of the pilot channel receiver 611 is divided into the first pilot signal and the second pilot signal after orthogonal despreading in the orthogonal despreaders 612 and 613. The power estimators 614 and 615 estimate the reception power of the orthogonally despread first and second pilot signals. The service load estimator 616 estimates the voice service load utilizing the estimated reception power of the first and second pilot signals, for example, by $$\text{voice service load} = \frac{\text{estimated comparative pilot signal power}}{\text{estimated reference pilot signal power}} \tag{3}$$

A data service load that the base station can bear is estimated by subtracting the voice service load from the total serviceable load. Then, the reception power of the data service is estimated based on the estimated data service load. Here, the data service reception power can be achieved using a predetermined algorithm based on the reception power of the pilot signals and the estimated data service load, or referring to an internal mapping table. If the voice service load is 0.3 and a ratio of the transmission power of a common channel including a pilot channel to the overall transmission power is 0.25, the IS-2000 system calculates the data Ec/Io from the voice service load by total Ec/Io× (1−0.3−0.25), that is, data Ec/Io=total Ec/Io×(1−voice service load−(transmission power of the common channel/overall transmission power)). The total Ec/Io is known from Ec/Io of the received pilot and the pilot channel transmission power to total transmission power ratio 0.2 generally determined (total Ec/Io=pilot Ec/Io÷0.2). In the HDR system, if the voice service load is 0.3, data C/I=pilot C/I×(1−0.3). Herein, it is noted that a ratio of the transmission power of common channels to the overall transmission power is assumed to be known to the mobile station. That is, the ratio of the transmission power of the common channel to overall transmission power 0.25 and the pilot channel transmission power to total transmission power 0.2 are constant as parameters of a CDMA system.

The mobile station estimates the data service reception power of the base stations that belong to the active set and selects a base station capable of offering the highest data rate based on the estimated reception power, for a handoff. Or the mobile station can request the data rate for the data service from the selected base station.

Figure 7:
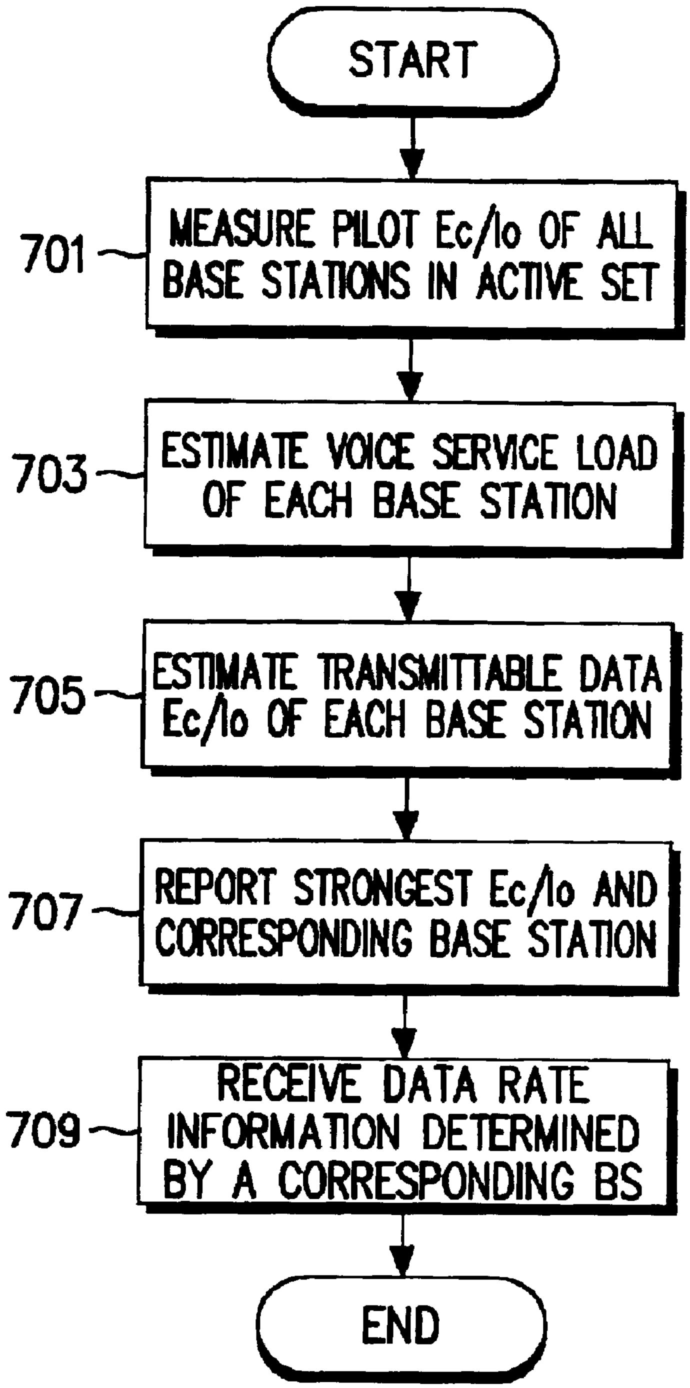
FIG. 7 is a flowchart illustrating a mobile station operation for receiving pilot signals transmitted continuously in time and estimating a voice service load from the pilot signals according to the first embodiment of the present invention.

FIG. 7 is a flowchart illustrating a mobile station operation for estimating a voice service load using pilot signals continuous in time according to the first embodiment of the present invention.

Referring to FIG. 7, the mobile station measures the reception power (Ec/Io) of pilot channel signals received from all base stations that belong to an active set managed for handoff by the mobile station in step 701. Each pilot channel signal includes two pilot signals spread with two different orthogonal codes, for example, a reference pilot signal and a comparative pilot signal. A comparative pilot-reference pilot power ratio represents the load of a voice service provided by a base station. In step 703, the mobile station estimates a voice service load by calculating a power ratio of two pilot signals received on each pilot channel. The mobile station estimates a data service load by subtracting the estimated voice service load from the overall load of each base station and then the reception power (Ec/Io) of the data service according to the estimated data service load in step 705. Then, the mobile station reports the strongest reception power and a base station corresponding to the strongest reception power to the network in step 707. Herein, it is noted that the network indicates a BSC including a BTS. The network determines an optimal data rate based on the reported base station information and informs the mobile station of the determined data rate. In step 709, the mobile station receives information about the determined data rate with respect to the transmitted base station information from the network.

Figure 8:
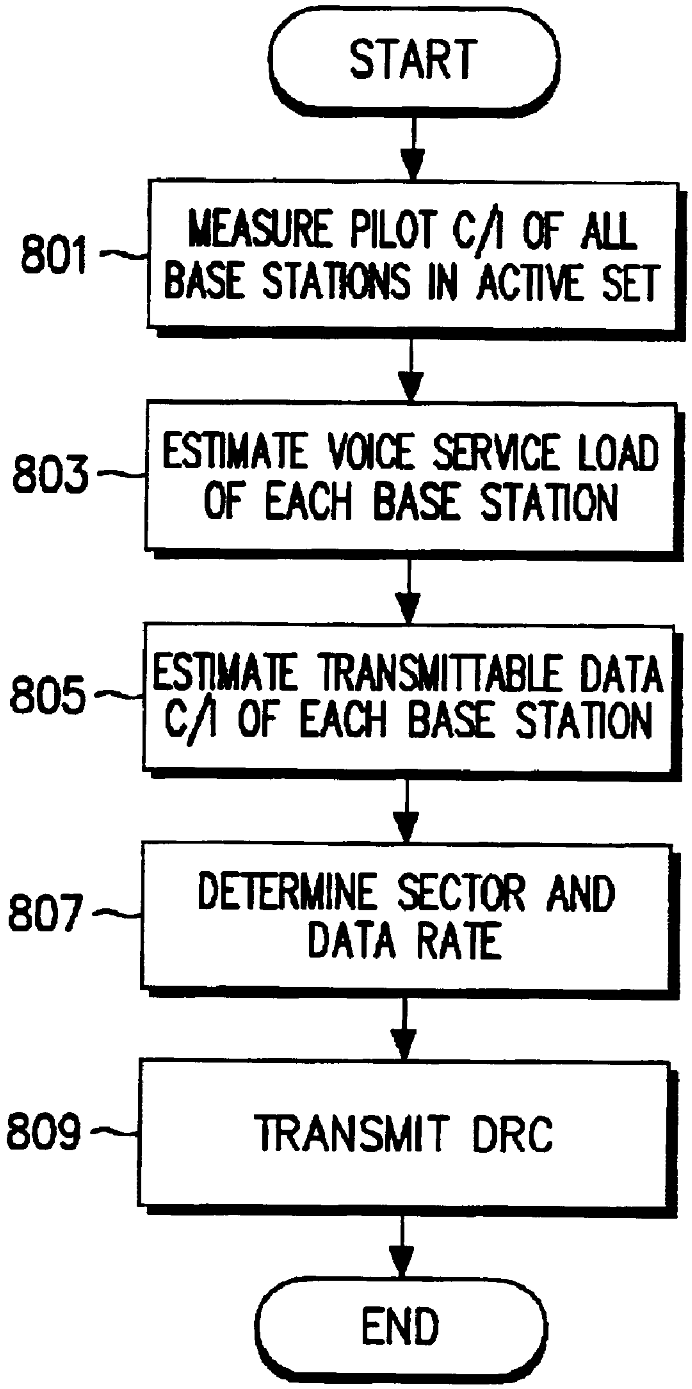
FIG. 8 is a flowchart illustrating a mobile station operation for receiving pilot signals transmitted periodically in time and estimating a voice service load from the pilot signals according to the second embodiment of the present invention.

FIG. 8 is a flowchart illustrating a mobile station operation for estimating a voice service load using pilot signals periodic in time according to the second embodiment of the present invention.

Referring to FIG. 8, the mobile station measures the reception power (C/I) of pilot channel signals received from all base stations that belong to an active set managed for handoff by the mobile station in step 801. Each pilot channel signal includes two pilot signals spread with two different orthogonal codes, for example, a reference pilot signal and a comparative pilot signal. A comparative pilot-reference pilot power ratio represents the load of a voice service provided by a base station. In step 803, the mobile station estimates a voice service load by calculating a power ratio of two pilot signals received on each pilot channel. The mobile station estimates a data service load by subtracting the estimated voice service load from the overall load of each base station and then the reception power (Ec/Io) of the data service according to the estimated data service load in step 805. Then, the mobile station determines a base station and a data rate corresponding the strongest reception power of the data service in step 807 and reports the selected base station and data rate to the network on a DRC channel in each slot in step 809.

As described above, a mobile station, for which a data service or both a data service and a voice service are being serviced, reports a network not the reception power of a pilot signal but the reception power of a data service based on a voice service load reported by a base station. Therefore, the mobile station can select a better base station in a handoff situation and receive a better quality data service at an optimal data rate in a normal situation.

Figure 9:
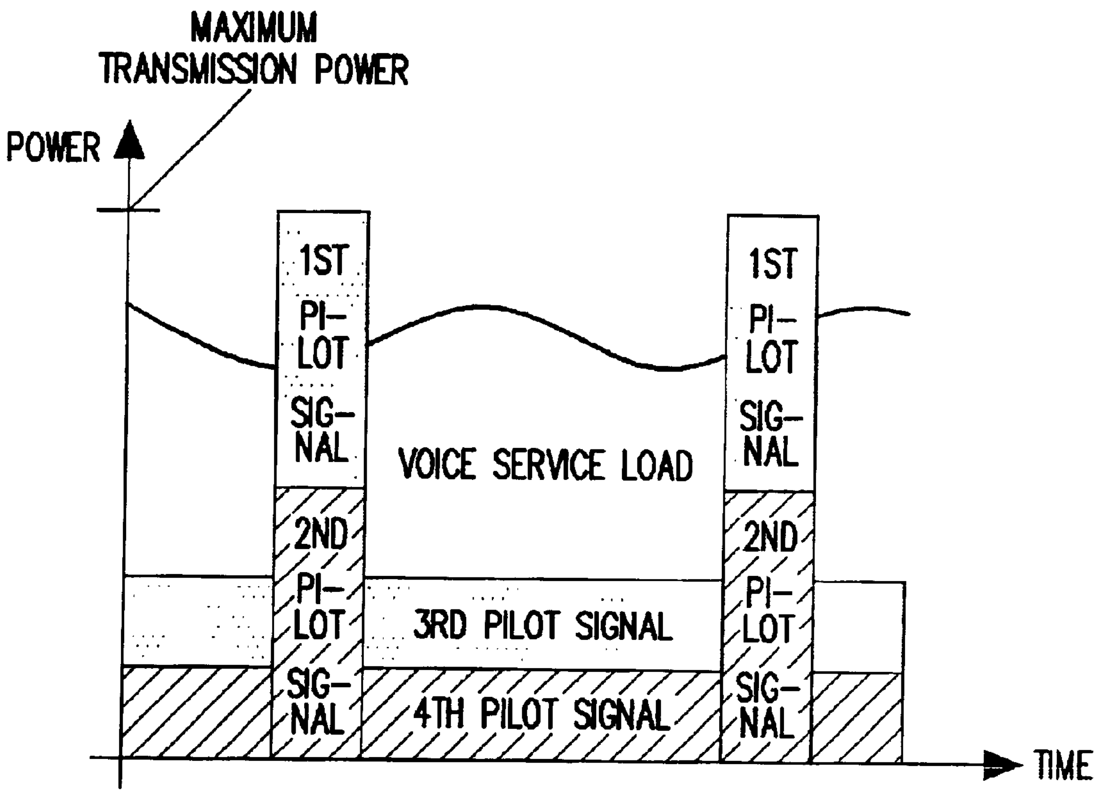
FIG. 9 is a graph showing pilot signals transmitted continuously in time, pilot signals transmitted periodically in time, and a voice service load according to a third embodiment of the present invention.

FIG. 9 illustrates pilot signals continuous in time, pilot signals periodic in time, and voice service load with respect to power and time according to a third embodiment of the present invention. This pilot signal transmission scheme supports both a system transmitting a pilot signal continuously in time and a system transmitting a pilot signal periodically in time. The mobile station acquires pilot signals continuous or periodic in time according to the pilot transmission scheme and service that it supports and estimates a voice service load in the procedure shown in FIG. 7 or FIG. 8.

In accordance with the present invention, a mobile station, which receives a data service or both a data service and a voice service at the same time, can more accurately estimate the reception power of a data service based on a voice service load reported by a base station. Therefore, the mobile station can select a better base station in a handoff situation and receive a better quality data service at an optimal data rate in a normal situation.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitter in a base station, comprising:

a pilot gain controller for generating a first gain value and a second gain value according to a current transmission power and a remaining transmission power of the base station;

a first multiplier for receiving pilot bits, multiplying the pilot bits by the first gain value, and generating a first control signal, and thereby controlling the transmission power level of the pilot bits;

a second multiplier for receiving the pilot bits, multiplying the pilot bits by the second gain value, and generating a second control signal, and thereby controlling the transmission power level of the pilot bits;

a first spreader for generating a first pilot signal by spreading the first control signal with a first orthogonal code;

a second spreader for generating a second pilot signal by spreading the second control signal with a second orthogonal code; and an adder for adding the first pilot signal to the second pilot signal.

2. The transmitter of claim 1, wherein the first and second pilot signals are transmitted continuously in time.

3. The transmitter of claim 1, wherein the first and second pilot signals are transmitted periodically in time.

4. The transmitter of claim 1, wherein a ratio of the transmission power of the second pilot signal to the transmission power of the first pilot signal is the current transmission power.

5. A transmitter in a base station, comprising:

a pilot gain controller for generating a first gain value and a second gain value according to a current transmission power and a remaining transmission power of the base station;

a first pilot channel generator for receiving pilot bits and generating a first pilot channel signal by controlling the gain of the pilot bits with the first gain value and spreading the gain-controlled signal with a first orthogonal code;

a second pilot channel generator for receiving the pilot bits and generating a second pilot channel signal by controlling the gain of the pilot bits with the second gain value and spreading the gain-controlled signal with a second orthogonal code;

an adder for adding the first and second pilot channel signals; and a channel transmitter for PN-spreading the output signal of the adder, converting the frequency of the PN-spread signal, and transmitting the converted signal.

6. A method of reporting current transmission power to a mobile station by a base station, comprising the steps of:

generating a first gain value and a second gain value according to a current transmission power and a remaining transmission power;

receiving pilot bits;

generating a first pilot signal by controlling the transmission power level of the pilot bits with the first gain value and spreading the gain-controlled signal with a first orthogonal code, and transmitting the first pilot signal; and generating a second pilot signal by controlling the transmission power level of the pilot bits with the second gain value and spreading the gain-controlled signal with a second orthogonal code, and transmitting the second pilot signal.

7. The method of claim 6, wherein the first and second pilot signals are transmitted continuously in time.

8. The method of claim 6, wherein the first and second pilot signals are transmitted periodically in time.

9. The method of claim 6, wherein a ratio of the transmission power of the second pilot signal to the transmission power of the first pilot signal is the current transmission power.

* * * * *